US012622499B2

(12) United States Patent
Kim et al.

(10) Patent No.: US 12,622,499 B2
(45) Date of Patent: May 12, 2026

(54) COSMETIC MATERIAL IMPREGNATION MEMBER AND METHOD FOR MANUFACTURING SAME

(71) Applicant: KOLMAR KOREA CO., LTD., Sejong-si (KR)

(72) Inventors: Hyung Sang Kim, Sejong-si (KR); Chang Soo Lee, Sejong-si (KR); Koo Sup Ahn, Sejong-si (KR); Hye Jin Jung, Sejong-si (KR); Yeo Wool Lee, Sejong-si (KR); Eun Doo Lee, Seoul (KR); Sung Bong Kye, Seoul (KR); Da Jeong Bak, Seoul (KR); Kyung Rhim Lee, Seoul (KR)

(73) Assignee: KOLMAR KOREA CO., LTD., Sejong-si (KR)

( * ) Notice: Subject to any disclaimer, the term of this patent is extended or adjusted under 35 U.S.C. 154(b) by 849 days.

(21) Appl. No.: 17/786,204

(22) PCT Filed: Jul. 20, 2018

(86) PCT No.: PCT/KR2018/008251
§ 371 (c)(1),
(2) Date: Apr. 17, 2023

(87) PCT Pub. No.: WO2019/017742
PCT Pub. Date: Jan. 24, 2019

(65) Prior Publication Data
US 2023/0240428 A1 Aug. 3, 2023

(30) Foreign Application Priority Data
Jul. 20, 2017 (KR) ........................ 10-2017-0092196

(51) Int. Cl.
*A45D 34/04* (2006.01)
*A45D 44/00* (2006.01)
(Continued)

(52) U.S. Cl.
CPC ............. *A45D 34/04* (2013.01); *A45D 44/00* (2013.01); *B32B 3/04* (2013.01); *B32B 3/06* (2013.01);
(Continued)

(58) Field of Classification Search
None
See application file for complete search history.

(56) References Cited

U.S. PATENT DOCUMENTS 2,450,919 A * 10/1948 Runnels ................. A45D 33/34
401/200
3,337,895 A * 8/1967 Clements ............... A45D 33/34
428/101
(Continued)

FOREIGN PATENT DOCUMENTS

CN 103565082 A * 2/2014 ............. B65D 65/42
DE 10201350 A1 * 7/2003 ............. D04B 21/02
(Continued)

OTHER PUBLICATIONS

Machine Translation of JP2008183218A, Aug. 2008 (Year: 2008).*
(Continued)

*Primary Examiner* — Jeffrey A Vonch
(74) *Attorney, Agent, or Firm* — Bridgeway IP Law Group, PLLC; Sang Ho Lee; Hyun Woo Shin

(57) ABSTRACT

An embodiment of the present invention provides a cosmetic material impregnation member configured to be impregnated with a cosmetic material, which is applied to a cosmetic applicator when used, and a method for manufacturing the same. The member may comprise: an upper fabric layer woven to have a first mesh structure; a lower fabric layer woven to have a second mesh structure; and a support layer which includes a plurality of fiber yarns woven to connect the upper fabric layer and the lower fabric layer and
(Continued)

600 forms an impregnation space for the cosmetic material between the upper fabric layer and the lower fabric layer.

20 Claims, 12 Drawing Sheets

(51) Int. Cl.

| | |
|---|---|
| *B32B 3/04* | (2006.01) |
| *B32B 3/06* | (2006.01) |
| *B32B 3/24* | (2006.01) |
| *B32B 5/02* | (2006.01) |
| *B32B 5/26* | (2006.01) |
| *B32B 7/04* | (2019.01) |
| *B32B 37/10* | (2006.01) |
| *B32B 38/00* | (2006.01) |
| B32B 3/26 | (2006.01) |
| B32B 37/00 | (2006.01) |
| D03D 11/00 | (2006.01) |

(52) U.S. Cl.

CPC ............... *B32B 5/024* (2013.01); *B32B 5/26* (2013.01); *B32B 5/262* (2021.05); *B32B 5/263* (2021.05); *B32B 7/04* (2013.01); *A45D 2200/1009* (2013.01); *A45D 2200/1036* (2013.01); *B32B 3/266* (2013.01); *B32B 5/026* (2013.01); *B32B 5/028* (2013.01); *B32B 2037/0092* (2013.01); *B32B 37/10* (2013.01); *B32B 38/0004* (2013.01); *B32B 38/105* (2013.01); *D03D 11/00* (2013.01); *D10B 2403/021* (2013.01); *D10B 2403/0213* (2013.01); *D10B 2509/00* (2013.01); *Y10T 428/24033* (2015.01); *Y10T 428/24182* (2015.01); *Y10T 428/24322* (2015.01); *Y10T 428/24488* (2015.01); *Y10T 442/20* (2015.04); *Y10T 442/2016* (2015.04); *Y10T 442/30* (2015.04); *Y10T 442/3195* (2015.04)

(56) References Cited

U.S. PATENT DOCUMENTS

| | | | | |
|---|---|---|---|---|
| 3,602,964 | A * | 9/1971 | Currier | D03D 25/00 |
| | | | | 28/169 |
| 4,983,173 | A * | 1/1991 | Patience | A61F 13/36 |
| | | | | 604/384 |
| 5,480,699 | A * | 1/1996 | Gerhartl | A61F 13/20 |
| | | | | 424/443 |
| 5,589,245 | A * | 12/1996 | Roell | D03D 27/10 |
| | | | | 428/920 |
| 6,155,083 | A * | 12/2000 | Goeser | A61F 13/538 |
| | | | | 66/196 |
| 2003/0106346 | A1 * | 6/2003 | Matsumoto | D04B 21/10 |
| | | | | 66/195 |
| 2009/0068240 | A1 * | 3/2009 | Babe | H04L 27/2655 |
| | | | | 424/401 |
| 2010/0062029 | A1 * | 3/2010 | Roreger | C11D 17/049 |
| | | | | 424/401 |
| 2010/0327243 | A1 * | 12/2010 | Deschamps | D03D 15/46 |
| | | | | 428/221 |
| 2011/0311755 | A1 * | 12/2011 | Crawford | D06M 23/08 |
| | | | | 428/68 |
| 2014/0100589 | A1 * | 4/2014 | Gordon | A45D 44/22 |
| | | | | 606/131 |
| 2015/0079862 | A1 * | 3/2015 | Jeong | A61K 8/0204 |
| | | | | 29/458 |
| 2018/0027941 | A1 * | 2/2018 | Choi | A01N 25/08 |
| 2018/0140071 | A1 * | 5/2018 | Cho | B32B 5/26 |
| 2018/0207066 | A1 * | 7/2018 | Lechanoine | A45D 33/34 |
| 2018/0235344 | A1 * | 8/2018 | Yamanaka | D04H 1/5412 |
| 2019/0335879 | A1 * | 11/2019 | Park | A45D 34/04 |

FOREIGN PATENT DOCUMENTS

| | | | | | |
|---|---|---|---|---|---|
| DE | 102009025466 | A1 * | 12/2010 | .............. | D03D 1/00 |
| DE | 102013016501 | A1 * | 4/2015 | .............. | D04B 21/16 |
| FR | 2700140 | A1 * | 7/1994 | .............. | D04H 1/48 |
| FR | 3002727 | A1 * | 9/2014 | .............. | A45D 37/00 |
| JP | H06-315412 | A | 11/1994 | | |
| JP | 2000287746 | A * | 10/2000 | | |
| JP | 2002136336 | A * | 5/2002 | | |
| JP | 2005021202 | A * | 1/2005 | | |
| JP | 2005-102710 | A | 4/2005 | | |
| JP | 2005-312765 | A | 11/2005 | | |
| JP | 2005-349143 | A | 12/2005 | | |
| JP | 2006263432 | A * | 10/2006 | | |
| JP | 2006288468 | A * | 10/2006 | | |
| JP | 2007-007062 | A | 1/2007 | | |
| JP | 2008-174864 | A | 7/2008 | | |
| JP | 2008-184711 | A | 8/2008 | | |
| JP | 2008183218 | A * | 8/2008 | | |
| JP | 2009028392 | A * | 2/2009 | | |
| JP | 2009-247805 | A | 10/2009 | | |
| JP | 2009280927 | A * | 12/2009 | | |
| JP | 2009285316 | A * | 12/2009 | | |
| JP | 2012095968 | A * | 5/2012 | | |
| KR | 100300303 | B1 * | 9/2001 | .............. | A45D 34/04 |
| KR | 200380018 | Y1 * | 3/2005 | .............. | A45D 34/04 |
| KR | 10-2005-0071784 | A | 7/2005 | | |
| KR | 20-0400088 | Y1 | 11/2005 | | |
| KR | 20100128163 | A * | 12/2010 | .............. | B32B 5/24 |
| KR | 20120077844 | A * | 7/2012 | .............. | A45D 34/04 |
| KR | 200463383 | Y1 * | 11/2012 | .............. | A45D 44/02 |
| KR | 10-1323495 | B1 | 10/2013 | | |
| KR | 10-1368622 | B1 | 3/2014 | | |
| KR | 101406292 | B1 * | 6/2014 | ........ | B32B 37/1284 |
| KR | 20140134982 | A * | 11/2014 | .............. | A61K 9/70 |
| KR | 20160008794 | A * | 1/2016 | .............. | A45D 34/00 |
| KR | 10-2017-0010458 | A | 2/2017 | | |
| KR | 20170064995 | A * | 6/2017 | .............. | A45D 34/04 |
| KR | 20170079217 | A * | 7/2017 | ........ | B32B 38/0004 |
| KR | 20170094998 | A * | 8/2017 | .............. | A45D 40/26 |
| KR | 20170102593 | A * | 9/2017 | .............. | B32B 7/04 |
| KR | 20170106936 | A * | 9/2017 | .............. | B32B 5/18 |
| KR | 20170114129 | A * | 10/2017 | .............. | A45D 44/02 |
| KR | 10-2018-0047781 | A | 5/2018 | | |
| WO | WO-9308985 | A1 * | 5/1993 | .............. | D04B 1/16 |
| WO | WO-2009066086 | A1 * | 5/2009 | .............. | A61H 7/003 |
| WO | WO-2010002256 | A2 * | 1/2010 | .............. | A45D 34/04 |
| WO | 2014/177557 | A1 | 11/2014 | | |
| WO | WO-2018174620 | A1 * | 9/2018 | .............. | D06M 17/10 |
| WO | WO-2019007809 | A1 * | 1/2019 | .............. | A45D 34/00 |
| WO | WO-2019077760 | A1 * | 4/2019 | .............. | A45D 33/006 |
| WO | WO-2019088682 | A1 * | 5/2019 | .............. | A45D 40/00 |
| WO | WO-2019131793 | A1 * | 7/2019 | .............. | D04B 21/16 |
| WO | WO-2019185161 | A1 * | 10/2019 | .............. | D04B 1/16 |
| WO | WO-2019185162 | A1 * | 10/2019 | .............. | A45D 34/04 |

OTHER PUBLICATIONS

Machine Translation of DE102009025466A1, Dec. 2010 (Year: 2010).*
Machine Translation of DE102013016501A1, Apr. 2015 (Year: 2015).*
Foreign Priority Document for WO2019007809A1—FR1756413A, Jul. 2017 (Year: 2017).*
Foreign Priority Document for US20190335879A1—KR1020170057005A, May 2017 (Year: 2017).*
Machine Translation of DE10201350A1, Jul. 2003 (Year: 2003).*
Machine Translation of JP2009285316A, Dec. 2009 (Year: 2009).*
Machine Translation of KR20170094998A, Aug. 2017 (Year: 2017).*
Machine Translation of WO2019088682A1, May 2019 (Year: 2019).*

* cited by examiner

100

200

210

300

200 300

(a) (b)

200'                                                              300

(a)                                                              (b)

200″

600

690 610 630

650 670

_700_

(a)

(b)

(a)

(b)

(c)

COSMETIC MATERIAL IMPREGNATION MEMBER AND METHOD FOR MANUFACTURING SAME

TECHNICAL FIELD

The present invention relates to a cosmetic material impregnation member and a method of manufacturing the same, and more particularly, to a cosmetic material impregnation member formed of a fabric and a method of manufacturing the same.

BACKGROUND ART

Most conventional compact products have a pressed compact formulation made by compressing powder contents. Since these compact products are present in a solid state of powder, there has been inconvenience due to powder scattering, and particularly, there has been a problem in that cosmetic performance was degraded compared to a liquid cosmetic material.

To solve these problems, various impregnation members impregnated with a liquid cosmetic material have been tried, and representatively, a compact product formed by impregnating a sponge or a polyurethane foam with a cosmetic material is very popular.

The compact product has an advantage in terms of usability and portability since it can be impregnated with a liquid cosmetic material, but sponge or polyurethane does not have sufficient elasticity or supporting capacity, and is easily damaged, causing inconvenience to users.

Particularly, since an impregnation member such as sponge or polyurethane is manufactured by a chemical process, it is difficult to manufacture, and to control impregnation capacity or a release level suitable for a specific cosmetic material. In addition, the above-described impregnation member is vulnerable to external stimuli such as oxygen, UV rays, oil and alcoholic ingredients such as ethanol, and thus is degraded in durability or has contaminants.

To solve these problems, impregnation members formed of a fiber material have been suggested, but they are used only as an auxiliary means of the impregnation member such as sponge or polyurethane because of their poor impregnation with a cosmetic material or weak supporting capacity/shape restoration.

Therefore, the present invention that can solve such problems requires a cosmetic material impregnation member and a method of manufacturing the same.

DISCLOSURE

Technical Problem

To solve the above-described problems, the present invention is directed to providing a cosmetic material impregnation member which consists of a fabric and is able to provide excellent supporting capacity and excellent impregnation capacity, and a method of manufacturing the same.

Technical problems to be solved in the present invention are not limited to the above-described problems, and other problems which are not described herein will be clearly understood by those of ordinary skill in the art from the following descriptions.

Technical Solution

One aspect of the present invention provides a cosmetic material impregnation member, which is impregnated with a cosmetic material to be used by being applied to a cosmetic applicator. The member may include an upper fabric layer woven to have a first mesh structure; a lower fabric layer woven to have a second mesh structure; and a support layer consisting of a plurality of fiber yarns woven to connect the upper fabric layer and the lower fabric layer and creating an impregnation space for the cosmetic material between the upper fabric layer and the lower fabric layer.

Preferably, each of the first mesh structure and the second mesh structure may have a plurality of release pores, a release level may be determined based on the sum of the areas of the release pores and the sum of the circumferences of the release pores, and the amount of inflow and outflow of the cosmetic material may be determined according to the release level.

In addition, preferably, the first mesh structure and the second mesh structure have different release levels.

In addition, preferably, a plurality of the fiber yarns may connect the upper fabric layer and the lower fabric layer at the same or different angles.

In addition, preferably, the first mesh structure of the upper fabric layer may consist of a plurality of mesh structures formed in different regions and having different release levels.

In addition, preferably, the cosmetic material impregnation member may further include a side fabric layer woven to connect edges of the upper fabric layer and the lower fabric layer and have a third mesh structure.

In addition, preferably, the edges of the upper fabric layer and the lower fabric layer may be bonded to release the cosmetic material impregnated in the support layer through the mesh structures.

Another aspect of the present invention provides a cosmetic material impregnation member set. The set may include a plurality of cosmetic material impregnation members according to one embodiment of the present invention, and a plurality of the cosmetic material impregnation members may be laminated as a whole by bonding their edges with each other.

Still another aspect of the present invention provides a cosmetic material impregnation member set. The set may include a plurality of cosmetic material impregnation members according to one embodiment of the present invention; and a fabric pouch accommodating a plurality of the laminated cosmetic material impregnation members.

Yet another aspect of the present invention provides a method of manufacturing a cosmetic material impregnation member, which is impregnated with a cosmetic material to be used by being applied to a cosmetic applicator. The method may include forming a fabric member including an upper fabric layer having a first mesh structure; a lower fabric layer having a second mesh structure; and a support layer consisting of a plurality of fiber yarns connecting the upper fabric layer and the lower fabric layer and creating an impregnation space for the cosmetic material between the upper fabric layer and the lower fabric layer.

Preferably, the forming step may be performed by weaving the upper fabric layer, the lower fabric layer and the support layer as a whole.

In addition, preferably, each of the first mesh structure and the second mesh structure may have a plurality of release pores, a release level may be determined based on the sum of the areas of the release pores and the sum of the circumferences of the release pores, and the amount of inflow and outflow of the cosmetic material may be determined according to the release level.

In addition, preferably, the first mesh structure and the second mesh structure may have different release levels.

In addition, preferably, a plurality of the fiber yarns may connect the upper fabric layer and the lower fabric layer at the same or different angles.

In addition, preferably, the first mesh structure of the upper fabric layer may consist of a plurality of mesh structures formed in different regions and having different release levels.

In addition, preferably, the method may further include weaving a side fabric layer which connects edges of the upper fabric layer and the lower fabric layer and has a third mesh structure.

In addition, preferably, the method may further include bonding the edges of the upper fabric layer and the lower fabric layer to release the cosmetic material impregnated in the support layer through the mesh structures.

In addition, preferably, the bonding step may include disposing the fabric member on a sealing plate; pressurizing the fabric member downward with a contact blade projecting in a predetermined shape so that the edges of the upper fabric layer and the lower fabric layer of the fabric member are in contact with each other; and sealing the edges of the upper fabric layer and the lower fabric layer by generating internal heat at the edges from the sealing plate under pressurization.

Yet another aspect of the present invention provides a method of manufacturing a cosmetic material impregnation member set. The method may include laminating a cosmetic material impregnation member according to one embodiment of the present invention; and bonding edges of the overlapping layers of the cosmetic material impregnation member with each other.

Preferably, the laminating step may be performed through a folding process which allows a plurality of regions of the cosmetic material impregnation member to overlap each other.

Advantageous Effects

Compared to an impregnation member such as sponge or polyurethane, as a cosmetic material impregnation member according to the present invention is formed of a fabric, swelling, erosion, deformation and pigment elution caused by cosmetic materials or other chemicals (alcohols, oils, etc.) cannot occur, and because it contains no environmentally harmful substances such as heavy metals or phthalates, more improved user stability can be provided.

In addition, according to the present invention, compared to a case in which components are individually woven and adhered together or connected by weaving, an upper fabric layer, a lower fabric layer and a support layer connecting them can be formed as a whole, thereby preventing damage caused by bonding or a risk of separation.

In addition, according to the present invention, while mesh structures are formed on the upper/lower fabric layers of the cosmetic material impregnation member, by changing a mesh-form weaving pattern of release pores, the release level of a cosmetic material impregnated in a support layer may be easily adjusted. Particularly, by having different mesh structures of the upper fabric layer and the lower fabric layer, or forming different mesh structures in different regions on a fabric layer, various release levels can be provided, which improves convenience and usability for a user.

In addition, according to the present invention, as the density of fiber yarns constituting the support layer can be easily changed, the supporting capacity of the cosmetic material impregnation member and the impregnation capacity of the cosmetic material can be easily and variously changed for a user's convenience or according to the use of the impregnation member.

In addition, according to the present invention, in the cosmetic material impregnation member, as edges of the upper fabric layer and the lower fabric layer with each other are bonded with each other, lateral leakage of the cosmetic material impregnated in the support layer, which does not pass through the mesh structures of the upper fabric layer and the lower fabric layer, can be prevented, thereby eliminating leakage of the cosmetic material, contamination of a container for a cosmetic product due to the leakage, and inconvenience for a user.

In addition, according to the present invention, the efficiency of the process of manufacturing a cosmetic material impregnation member can be improved because the edges of the cosmetic material impregnation members can be easily bonded through internal heat sealing such as ultrasonic sealing and cutting unnecessary components (that is, external parts of the edge) of the cosmetic material impregnation member.

In addition, according to the present invention, by laminating a plurality of cosmetic material impregnation members, sufficient space for impregnation and supporting capacity generated by the support layer can be simultaneously ensured, and particularly, by bonding the edges of the laminated cosmetic material impregnation members, the impregnation members can be connected as a whole and thus can prevent leakage of the cosmetic material.

DESCRIPTION OF DRAWINGS

A brief description of each drawing is provided so that the drawings cited in the detailed description of the present invention can be more fully understood.

MODES OF THE INVENTION

Figure 1:
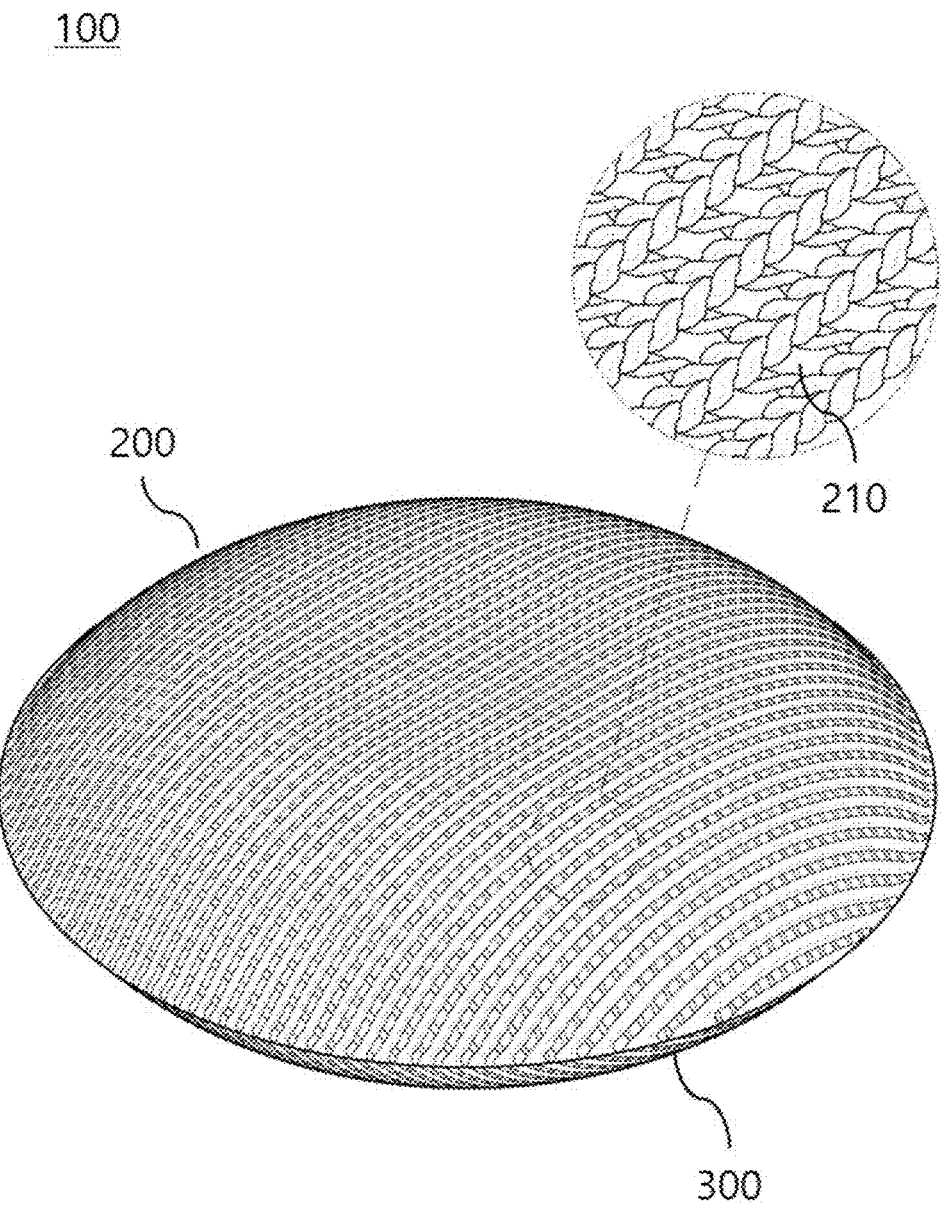
FIG. 1 is a perspective view of a cosmetic material impregnation member according to one embodiment of the present invention.

Hereinafter, some exemplary embodiments of the present invention will be described in detail with reference to exemplary drawings. It should be noted that, when reference numerals are assigned to components of each drawing, like components are denoted by the same reference numerals, even if they are represented in different drawings. In addition, in explanation of embodiments of the present invention, detailed descriptions of known configurations or functions related thereto will be omitted when it is determined that the detailed descriptions would hinder the understanding of embodiments of the present invention. In addition, although embodiments of the present invention will be described below, the technical spirit of the present invention is not limited thereto and may be modified to be implemented in various forms by those of ordinary skill in the art.

Throughout the specification, when a part is "connected" with another part, it means that the one part is "directly connected," or "indirectly connected" with a third member therebetween. In addition, when a certain part "includes" a certain component, it means that, unless particularly stated otherwise, another component may be further included, rather than excluding the other component. In addition, to describe the components of the embodiment of the present invention, terms "first," "second," "A," "B," "(a)," "(b)," etc. may be used. These terms are only used to distinguish components from other components, and the essence, order or sequence of the corresponding components is not limited by the term.

The present invention relates to a cosmetic material impregnation member, which may be contained in various shapes of containers for cosmetic products while a cosmetic material is impregnated. When a cosmetic product container is open/closed, a part of the cosmetic material impregnation member may be exposed to the outside, and the cosmetic material impregnated in the cosmetic material impregnation member may be used by smearing it on a cosmetic applicator (e.g., a puff).

Here, the cosmetic material may be any of various cosmetic materials, for example, a lotion, a milk lotion, a moisture lotion, a nourishing lotion, a skin lotion, a skin softener, a skin toner, an astringent, a massage cream, a nourishing cream, a moisture cream, a sunscreen, an essence, a sun milk, a BB cream, a base, a foundation, a CC cream, a sunblock, a blusher, a concealer, an eyeshadow and an eyebrow, and these cosmetic materials are preferably liquid, but at least some may be non-liquid (that is, solid or semi-solid) according to an embodiment.

The cosmetic material impregnation member of the present invention may be formed of a fabric, and manufactured by weaving, for example, a natural fiber, an artificial fiber or a combination thereof. Here, the natural fiber may be any of cotton, kapok cotton, coir, manila hemp, sisal hemp, flax, ramie, hemp, kenaf, abaca, Sisal hemp, kapok, jute, wool, goat's wool, cashmere, camel's hair, alpaca, wool fiber, cultivated silk, wild silk, asbestos and a cellulose-based fiber, and the artificial fiber may be any of polynosic rayon, viscose rayon, leupra rayon, acetate, triacetate, a polyester-based fiber, a polyurethane-based fiber, a polyethylene-based fiber, a polyvinyl chloride-based fiber, a polyvinylidene-based fiber, a polytetrafluoroethylene-based fiber, a polyolefin-based fiber, a polyamide-based fiber, a casein-fiber, an alginic acid fiber, a cellulose-based fiber, a rubber fiber, SBR and NR, but the present invention is not limited thereto.

Since the cosmetic material impregnation member of the present invention is formed of fabric, compared to an impregnation member such as sponge or polyurethane, there may not be swelling, erosion, deformation or pigment elution caused by cosmetic materials or other chemicals (alcohols, oils, etc.), and because there are no environmentally harmful substances such as heavy metals or phthalates, more improved user stability may be provided.

In addition, in the cosmetic material impregnation member of the present invention, a cosmetic material may be impregnated not only in a space created by an upper fabric layer, a lower fabric layer and a support layer, but also in a fabric constituting the cosmetic material impregnation member, that is, fiber yarns forming the upper fabric layer, the lower fabric layer and the support layer. Accordingly, compared to the prior art, more improved absorption and impregnation capacity of a cosmetic material may be provided.

Figure 2:
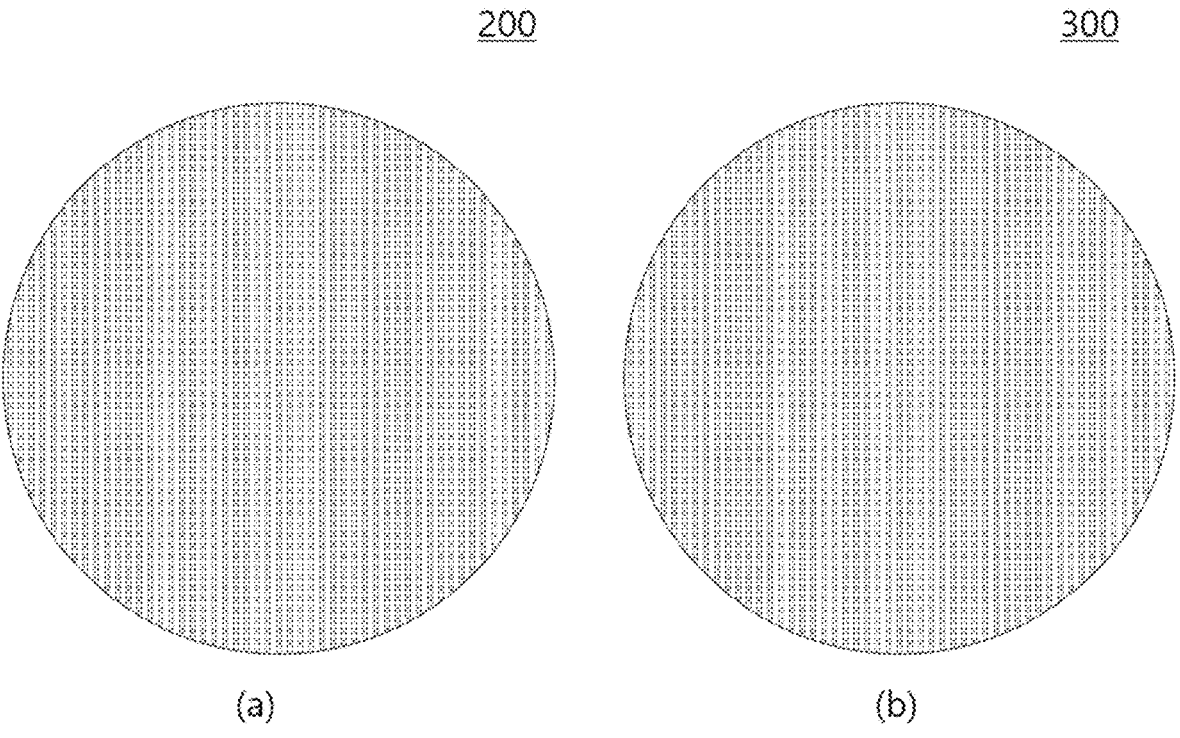
FIG. 2 is a plan view and a bottom view of the cosmetic material impregnation member of FIG. 1.
Figure 3:
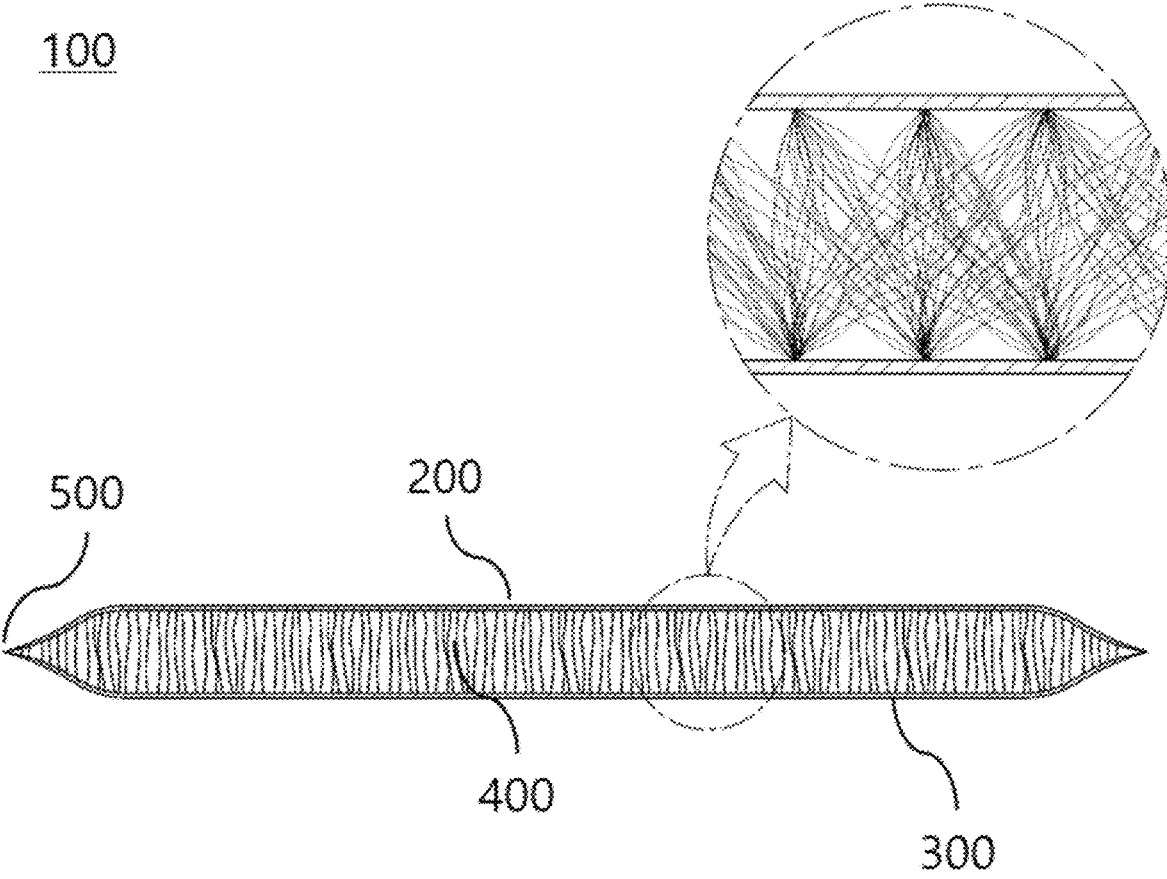
FIG. 3 is a cross-sectional view of the cosmetic material impregnation member of FIG. 1.

FIG. 1 is a perspective view of a cosmetic material impregnation member according to one embodiment of the present invention, FIG. 2 is a plan view and a bottom view of the cosmetic material impregnation member of FIG. 1, and FIG. 3 is a cross-sectional view of the cosmetic material impregnation member of FIG. 1.

Referring to FIGS. 1 to 3, the cosmetic material impregnation member 100 may include an upper fabric layer 200, a lower fabric layer 300 and a support layer 400.

The upper fabric layer 200 and the lower fabric layer 300 form the upper and lower surfaces of the cosmetic material impregnation member 100, respectively, and may be formed by weaving fiber yarns to have predetermined mesh structures. The mesh structure is a fabric in which there are a plurality of release pores 210, and may have various shapes of release pores 210, for example, round shapes, and polygonal shapes. To impregnate the cosmetic material in the cosmetic material impregnation member 100, the cosmetic material may enter through the mesh structures, and when the cosmetic material is used, the impregnated cosmetic material may be released through the mesh structures.

Here, the extent to which the cosmetic material is released, that is, a release level, may vary according to the specific gravity of the release pores 210 in a mesh structure or the inner surface area of the release pores 210. For example, the release level may be determined as the ratio of "sum of areas of release pores 210" to "sum of circumferences of release pores 210" (that is, "release level"="sum of areas of release pores 210"/"sum of circumferences of release pores 210"). Here, the sum of the circumferences of the release pores 210 is the size of a frictional force disturbing the migration of the cosmetic material, and the sum of the areas of the release pores 210 may be the size of a pathway along which the cosmetic material migrates. Therefore, as the release level decreases (that is, the larger the sum of the circumferences of the release pores 210), the cosmetic material is less easily released, and in contrast, as the release level increases (that is, as the "sum of the areas of the release pores 210" is relatively larger), the cosmetic material may be more easily released.

The support layer 400 may be formed of a plurality of fiber yarns (or pile yarns), and each fiber yarn may be woven to connect the upper fabric layer 200 and the lower fabric layer 300. The support layer 400 may cause the upper fabric layer 200 to be spaced a predetermined distance apart from the lower fabric layer 300 and support the fabric layers. In addition, due to elastic restoration created by a plurality of the fiber yarns, the cosmetic material impregnation member 100 may be restored to its original shape even when deformation is induced by applying an external force to the cosmetic material impregnation member 100, and cause the cosmetic material to be impregnated in a space created by the fiber yarns between the upper fabric layer 200 and the lower fabric layer 300. The cosmetic material impregnated in the support layer 400 may be released to the outside through a mesh of the upper fabric layer 200 and/or lower fabric layer 300 when an external force is applied to the cosmetic material impregnation member 100.

The fiber yarns in the support layer 400 may have a predetermined inclination within a range capable of providing suitable elastic restoration to connect the upper fabric layer 200 and the lower fabric layer 300, and here, each of the fiber yarns may be disposed at the same or different angles.

Specifically, as shown from the enlarged view of FIG. 3, on the upper fabric layer 200 and the lower fabric layer 300, there may be at least one upper convergence point and at least one lower convergence point, and a plurality of the fiber yarns forming the support layer 400 may be bonded to connect the upper convergence points and the lower convergence points. Here, each convergence point may be disposed to be spaced apart from another convergence point, and the spacing distances between convergence points may be the same or different.

The fiber yarns of the support layer 400 may connect upper convergence points and lower convergence points, and a plurality of the fiber yarns having one end binding to any convergence point may bind to the same convergence point and/or to a plurality of different convergence points at the other end. For example, the fiber yarns binding to a lower convergence point may be connected to an upper convergence point at angles from 20 to 160 degrees, and preferably 45 to 135 degrees, based on the fiber yarns binding to the lower fabric layer 300. Likewise, the fiber yarns binding to the upper convergence point may also be connected to a lower convergence point to be disposed in the angle range from 20 to 160 degrees, and preferably 45 to 135 degrees, based on the upper fabric layer 200.

The density of fiber yarns constituting the support layer 400 may vary depending on an embodiment of the present invention, and accordingly, the amount of the cosmetic material that can be contained, an elastic restoring force and supporting capacity may also vary. For example, when the density of fiber yarns decreases, a cosmetic material charging space in the support layer 400 may increase, and as friction caused by the fiber yarns is reduced when the cosmetic material migrates, and therefore the cosmetic material may be easily released even with a small external force, and the supporting capacity and elastic restoration of the support layer 400 may be weakened. On the other hand, when the density of the fiber yarns increases, friction caused by the fiber yarns may increase when the cosmetic material migrates, and therefore the cosmetic material may not be easily released and the supporting capacity and elastic restoring force of the support layer 400 may increase, but the cosmetic material filling space in the support layer 400 may be reduced.

In addition, edges 500 of the upper fabric layer 200 and the lower fabric layer 300 may be bonded with each other. The edge bonding may prevent a cosmetic material impregnated in the support layer 400 from leaking laterally without passing through the mesh structures of the upper fabric layer 200 and the lower fabric layer 300. This is in consideration of the fact that, if bonding is not performed, the support layer 400 may open laterally and expose the fiber yarns, and the impregnated state of the cosmetic material may be lost and the cosmetic material may leak to the outside, and particularly, when an external force is applied, a considerable amount of the cosmetic material in the cosmetic material impregnation member 100 and/or in the space accommodating a container for cosmetic products with the cosmetic material impregnation member 100 may leak to the outside.

Therefore, by performing bonding, it is possible to eliminate leakage of the cosmetic material to the outside of the cosmetic material impregnation member 100, contamination of the cosmetic container due to the leakage, and inconvenience for a user.

The edge bonding between the upper fabric layer 200 and the lower fabric layer 300 may be performed by various methods according to embodiments of the present invention. For example, methods using an adhesive material, external heat bonding in which heat is applied from the outside, and internal heat bonding in which heat is applied from the inside may be used. Particularly, in the case of internal heat bonding or external heat bonding, the cosmetic material impregnation member may be easily and safely bonded without having chemicals harmful to the human body or employing additional fixing/fastening means.

Such bonding between the upper fabric layer 200 and the lower fabric layer 300 is exemplary, and according to an embodiment, the cosmetic material impregnation member 100 may further include a side fabric layer, instead of the edges 500 of the upper fabric layer 200 and the lower fabric layer 300 being bonded together. The side fabric layer may have a mesh structure like the upper fabric layer 200 and the lower fabric layer 300, and may be woven to connect the edges 500 of the upper fabric layer 200 and the lower fabric layer 300. As the mesh structure of the side fabric layer has a lower release level than the mesh structures of the upper fabric layer 200 and the lower fabric layer 300, it is possible to prevent the cosmetic material from relatively leaking laterally. In addition, the side fabric layer may support a space between the upper fabric layer 200 and the lower fabric layer 300 to maintain the shape of the cosmetic material impregnation member 100.

The shape of the cosmetic material impregnation member 100 shown in FIGS. 1 to 3 is exemplary, and various shapes may be applied according to an example of the present invention.

Figure 4:
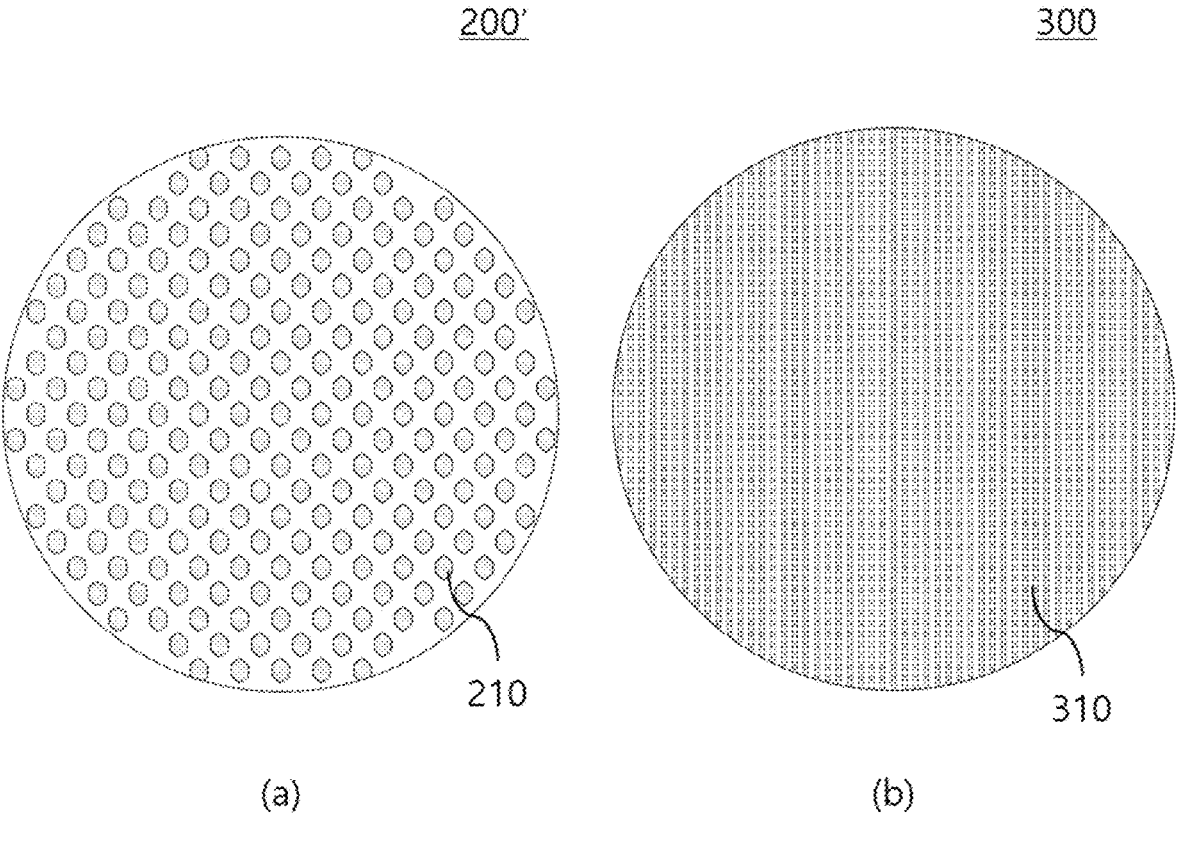
FIG. 4 shows a cosmetic material impregnation member according to one embodiment of the present invention.

FIG. 4 shows a cosmetic material impregnation member according to one embodiment of the present invention.

Specifically, (a) of FIG. 4 shows a mesh structure of an upper fabric layer 200', and (b) of FIG. 4 shows a mesh structure of a lower fabric layer 300.

Referring to FIG. 4, the upper fabric layer 200' and the lower fabric layer 300 may have different mesh structures. Specifically, the mesh structure of the upper fabric layer 200' may have larger release pores 210 than that of the lower fabric layer 300, but the sums of the areas of all release pores in the upper fabric layer 200' and in the lower fabric layer 300 may be the same.

In this case, since the mesh structure of the lower fabric layer 300 has the same sum of the areas of all release pores as the mesh structure of the upper fabric layer 200', but has a larger sum of the circumferences of release pores, and a lower release level. Therefore, in the lower fabric layer 300, compared to the upper fabric layer 200', a cosmetic material may less easily flow in/out through the release pores. In contrast, since the upper fabric layer 200' has a higher release level than the lower fabric layer 300, the cosmetic material may relatively more easily flow in/out.

Accordingly, the cosmetic material may be impregnated in the upper fabric layer 200' by being injected therethrough, and may be released through the upper fabric layer 200'. Taking advantage of the upper fabric layer 200' having a relatively higher release level, the cosmetic material is to be easily filled and released.

In addition, as the lower fabric layer 300 has a relatively lower release level, the leakage of the cosmetic material to the outside through the lower fabric layer 300 may be minimized, thereby reducing the contamination of a container for cosmetic products or the loss of the cosmetic material due to the downward leakage of the cosmetic material.

The mesh structure shown in FIG. 4 is exemplary, and various forms to make the mesh structure of the upper fabric layer and the mesh structure of the lower fabric layer have different release levels may be applied according to embodiments of the present invention. For example, the mesh structure of the upper fabric layer may be formed to have a smaller release level than the lower fabric layer. In this case, the cosmetic material may be injected through the lower fabric layer having a higher release level to impregnate it, and in contrast, when the cosmetic material is used, the cosmetic material is released by using the upper fabric layer having a relatively lower release level, thereby preventing excessive leakage of the cosmetic material due to easy filling of the cosmetic material and an external force.

Figure 5:
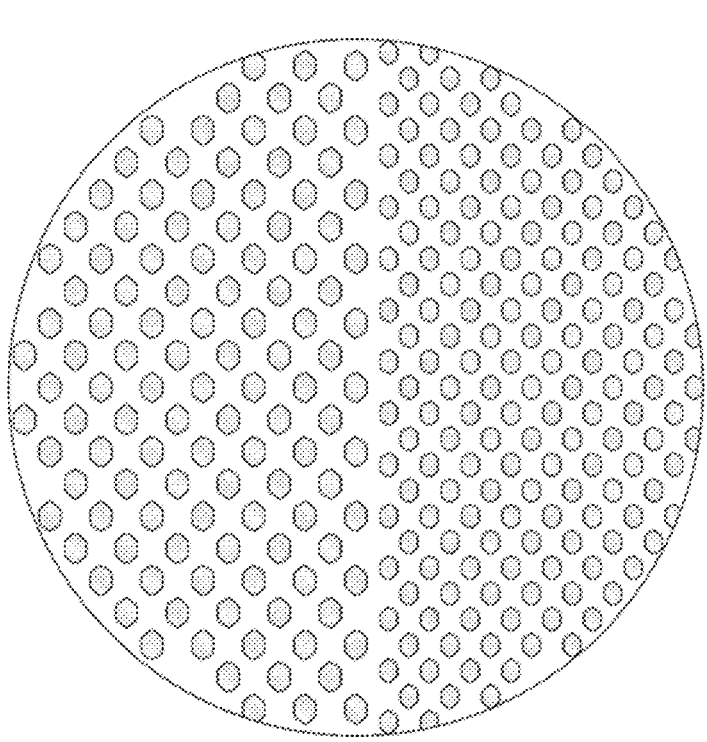
FIG. 5 shows a cosmetic material impregnation member according to one embodiment of the present invention.

FIG. 5 shows a cosmetic material impregnation member according to one embodiment of the present invention.

Referring to FIG. 5, an upper fabric layer 200″ may have a plurality of mesh structures. Specifically, the upper fabric layer 200″ may have a first mesh structure in the left region, and a second mesh structure in the right region. Here, the first mesh structure and the second mesh structure may be configured to have different release levels.

Accordingly, a user may control a cosmetic material to be released differently according to the pressurized position of a cosmetic applicator, and thus the release amount of the cosmetic material can be selected as needed.

The shape of the upper fabric layer 200″ shown in FIG. 5 is exemplary, and various shapes that cause the release levels to differ depending on a region according to an embodiment of the present invention may be applied. For example, the central region of the upper fabric layer may be configured to have a lower release level than the peripheral region thereof, and thereby it is possible to avoid releasing too much of the cosmetic material from the central region to which an external force is relatively frequently/strongly applied. That is, it is possible to uniformly release the cosmetic material throughout the upper fabric layer. Alternatively, for example, the central region of the upper fabric layer may be configured to have a higher release level than the peripheral region thereof, and therefore the cosmetic material may be intensively released from the central region to which an external force is relatively frequently/strongly applied.

Although not shown in FIGS. 1 to 5, according to an example of the present invention, the cosmetic material impregnation member 100 may further include an auxiliary layer.

Here, the auxiliary layer may be additionally bonded to the outside of the upper fabric layer 200 and/or the lower fabric layer 300 of the cosmetic material impregnation member 100, and may include, for example, a fiber layer such as a fabric or a non-woven fabric formed of a natural fiber, an artificial fiber or a combination thereof or a film layer formed of stretched polypropylene, polypropylene, polyethylene, polyethylene terephthalate, nylon or polyvinyl chloride, but the present invention is not limited thereto.

The auxiliary layer may be connected to the upper fabric layer 200 and/or the lower fabric layer 300, and may be bonded together at the edges 500 of the upper fabric layer 200 and the lower fabric layer 300 which are bonded. As the auxiliary layer is connected to the fabric layers 200 and 300 by such bonding of the edges 500, partial sealing of the entire surfaces of the fabric layers 200 and 300 may be prevented.

The auxiliary layer may change the surface shape and release level of the cosmetic material impregnation member 100. For example, the auxiliary layer may be bonded to the lower surface of the lower fabric layer 300 and configured to have waterproofness, thereby preventing the cosmetic material impregnated in the cosmetic material impregnation member 100 from leaking downward. Alternatively, for example, the auxiliary layer may be bonded to the upper surface of the upper fabric layer 200, and consist of a fiber layer having low elongation, such as organdy or tricot, thereby creating a specific logo or pattern, or adjusting the amount of the cosmetic material released.

According to an embodiment, the auxiliary layer may be impregnated with a functional material. The functional material may be, for example, chitosan for an antibacterial function, neem extract, basil extract, clove extract, or eucalyptus extract, but the present invention is not limited thereto.

In addition, according to an embodiment, a coating layer may be further bonded to the auxiliary layer. The coating layer provides waterproofness to the auxiliary layer, and may be formed by adhering a functional material (e.g., a waterproof material) such as a polyurethane film, silicone, Cupra or Tencel to one surface of the auxiliary layer consisting of a non-woven fabric. In this case, a coating layer bonded to one surface of the auxiliary layer faces outward, and the other surface of the auxiliary layer may be bonded to the lower fabric layer 300, thereby leaking the cosmetic material impregnated in the cosmetic material impregnation member 100 downward, and preventing the material from remaining in a cosmetic product container. Here, the auxiliary layer is for stably disposing the coating layer, and bonding it to the cosmetic material impregnation member 100. Accordingly, the shape of the auxiliary layer may be formed to correspond to the fabric layers 200 and 300 to be covered, or to correspond to at least the edges 500.

Hereinafter, all of an auxiliary layer, an auxiliary layer impregnated with a functional material and an auxiliary layer to which a coating layer is bonded are referred to as auxiliary layers for convenience of description, and such description should not be interpreted as referring only to a specific auxiliary layer.

Figure 6:
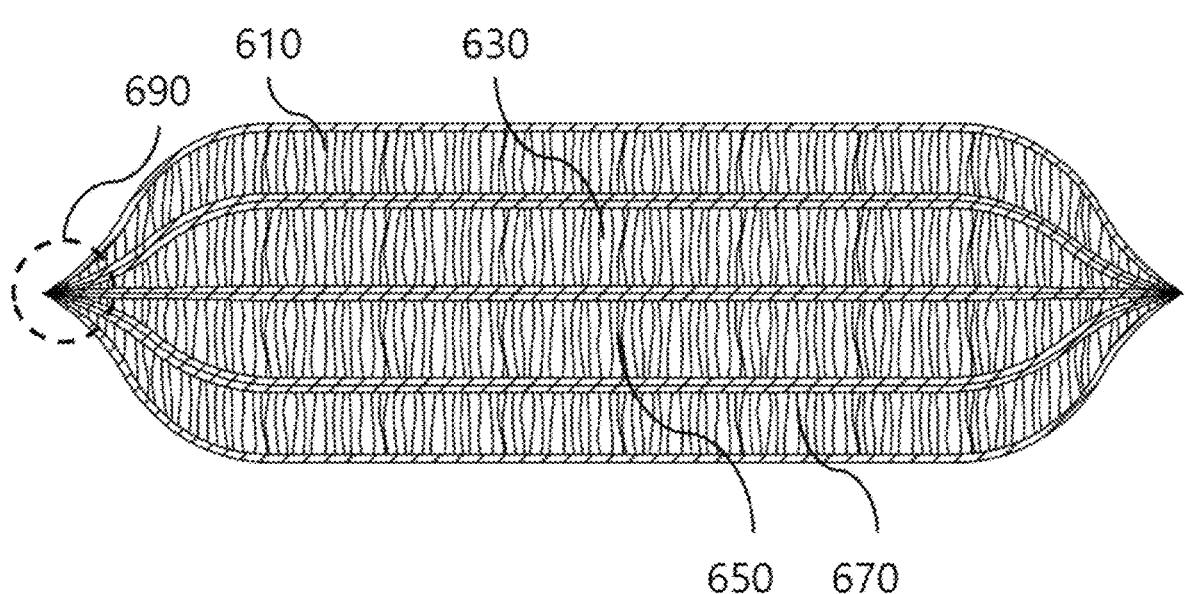
FIG. 6 shows a cosmetic material impregnation member set according to one embodiment of the present invention.

FIG. 6 shows a cosmetic material impregnation member set according to one embodiment of the present invention.

Referring to FIG. 6, a cosmetic material impregnation member set 600 may include a plurality of cosmetic material impregnation members 610, 630, 650 and 670. In the cosmetic material impregnation member set 600, a plurality of the cosmetic material impregnation members 610, 630, 650 and 670 may be laminated in a vertical direction, and formed as a whole by bonding the edges 690 together.

In the cosmetic material impregnation member 100 shown in FIGS. 1 to 5, since the support layer 400 is formed of fiber yarns to connect and support the upper fabric layer 200 or 200′ and the lower fabric layer 300, when the lengths of the fiber yarns exceed a predetermined range, their supporting capacity and shape restoration may be significantly reduced. To prevent such reduction, the fiber yarns constituting the support layer 400 have to have a length within the predetermined range, and in this case, the entire cosmetic material filling space of the support layer 400 may be reduced.

In light of this, as shown in FIG. 6, in the cosmetic material impregnation member set 600, rather than elongating the length of each fiber yarn, by laminating a plurality of the cosmetic material impregnation members 610, 630, 650 and 670, the entire cosmetic material filling space may be increased, and each support layer may have sufficient supporting capacity and shape restoration.

Here, to solidify the connective relation between the cosmetic material impregnation members 610, 630, 650 and 670 constituting the cosmetic material impregnation member set 600, the edges 690 of the cosmetic material impregnation members 610, 630, 650 and 670 may be bonded together. Here, the bonding may be performed by, for example, an adhesive material, external heat bonding of applying heat from the outside, or internal heat bonding of generating heat from the inside. In the case of external heat bonding or internal heat bonding, the cosmetic material impregnation members may be bonded easily and safely without having a chemical that can be harmful to the human body, or adopting an additional fixing/fastening means, for example, by applying an adhesive material.

The cosmetic material impregnation member set 600 shown in FIG. 6 is exemplary, and the configuration of various cosmetic material impregnation member sets consisting of a plurality of cosmetic material impregnation members according to embodiments of the present invention may be applied. For example, in a state in which the cosmetic material impregnation members are not bonded together and/or the upper fabric layer and the lower fabric layer of a cosmetic material impregnation member are not bonded with each other, a plurality of the cosmetic material impregnation members may be accommodated in a fabric pouch. Here, the fabric pouch is a fabric member that accommodates a plurality of the laminated cosmetic material impregnation members and tightly covers the members, and may have a predetermined mesh structure on its surface to properly release a cosmetic material impregnated in a plurality of the cosmetic material impregnation members.

In addition, according to one embodiment, the impregnation member set 600 may further include an auxiliary layer. The auxiliary layer may be additionally connected to the uppermost upper fabric layer and/or the lowermost lower fabric layer of the impregnation member set 600.

Figure 7:
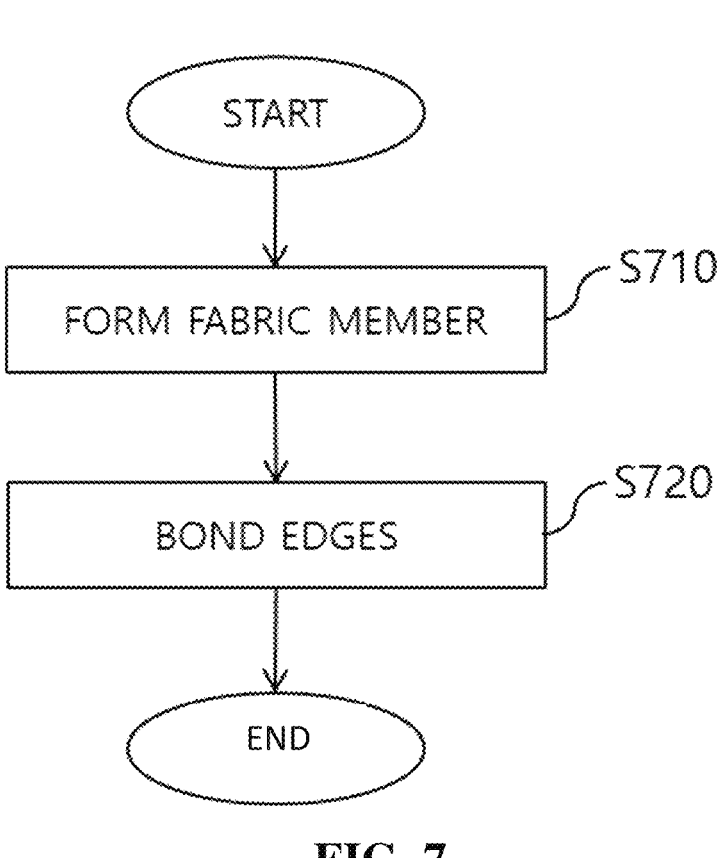
FIG. 7 illustrates a method of manufacturing a cosmetic material impregnation member according to one embodiment of the present invention.

FIG. 7 illustrates a method of manufacturing a cosmetic material impregnation member according to one embodiment of the present invention.

In S710, a fabric member may be formed. Here, the fabric member may consist of an upper fabric layer having a first mesh structure; a lower fabric layer having a second mesh structure; and a support layer consisting of a plurality of fiber yarns connecting the upper fabric layer and the lower fabric layer and creating an impregnation space for a cosmetic material between the upper fabric layer and the lower fabric layer. Unlike the cosmetic material impregnation members 100 shown in FIGS. 1 to 5, the fabric member includes the upper fabric layer and the lower fabric layer, which are not bonded with each other, and for convenience of classification, is referred to as a fabric member. However, the fabric member may also be used for impregnation of a cosmetic material, and thus the cosmetic material impregnation member in the present invention may include the fabric member.

S710 may be performed by weaving the upper fabric layer, the lower fabric layer and the support layer as a whole. Accordingly, compared to the case in which the upper fabric layer, the lower fabric layer and the support layer are individually woven and then adhered or connected through weaving, damage caused by bonding, or a separation risk may be prevented. However, the above-described method is exemplary, and according to embodiments of the present invention, various methods may be applied. For example, after the upper fabric layer and the lower fabric layer are individually woven, the support layer may be woven to connect the upper fabric layer and the lower fabric layer by a plurality of fiber yarns.

According to an embodiment, thermal treatment may be performed on the fabric member of S710. Here, the thermal treatment may be performed by applying heat to at least a part of the upper fabric layer, the lower fabric layer and the support layer of the fabric member (preferably, the fiber yarns of the support layer) to provide elasticity to the fabric member or adjust the thickness of the fabric member by increasing the width and length of the fabric member. Such thermal treatment may be performed at 150 to 220° C., preferably 160 to 210° C., more preferably 170 to 200° C., and most preferably 180 to 190° C. In addition, the thermal treatment may be performed in a hot wind environment at 1000 to 2500 rpm, preferably 1200 to 2200 rpm, more preferably 1400 to 2000 rpm, and most preferably 1600 to 1800 rpm. However, the above-described conditions are exemplary, and various temperatures and heat sources may be applied.

Subsequently, in S720, the edges of the upper and lower fabric layers may be bonded. In S720, since the support layer is open laterally and the fiber yarns are exposed, to prevent the leakage of the cosmetic material to the outside without maintaining the impregnation state of the cosmetic material, the cosmetic material impregnated in the support layer may be released through a mesh structure(s) of the upper fabric layer and/or the lower fabric layer by bonding the edges of the upper fabric layer and the lower fabric layer.

S720 may be performed by various methods according to embodiments of the present invention. For example, an adhesive material may be applied to edges 500 to adhere the upper fabric layer and the lower fabric layer, or external heat bonding for applying heat from the outside (by means of a heating/pressurizing member) or internal heat bonding for generating heat from the inside (using ultrasonic waves or low-frequency waves) may be performed.

In one embodiment, the method 700 may further include disposing an auxiliary layer. This step may be performed by disposing an auxiliary layer on the upper fabric layer and/or the lower fabric layer of the fabric member of S710. Afterward, an auxiliary layer disposed outside may also be bonded when the edges of the upper and lower fabric layers are bonded according to S720.

In addition, according to an embodiment, a coating layer may be additionally connected to the auxiliary layer. The coating layer may be formed by adhering a functional material such as a polyurethane film or silicone (e.g., a waterproof material) to at least one surface of the auxiliary layer consisting of a non-woven fabric to provide functionality such as waterproofness to the auxiliary layer. Specifically, the coating layer may be formed by applying a liquid adhesive material and connecting a polyurethane film thereto, or by applying liquid silicone such as Teflon to the auxiliary layer consisting of a non-woven fabric and applying heat. The coating layer connected to one surface of the auxiliary layer may face outward, and the other surface of the auxiliary layer may be disposed to face the fabric member, and the coating layer may also be bonded according to S720.

In one embodiment, the method 700 may further include weaving a side fabric layer, instead of S720. This step may be performed by weaving a side fabric layer having a mesh structure like the upper fabric layer and the lower fabric layer to connect the edges 500 of the upper fabric layer and the lower fabric layer.

In addition, after S720 is performed, according to an embodiment, the method 700 may further include impregnating a cosmetic material in the cosmetic material impregnation member 100 and/or disposing the cosmetic material impregnation member 100 in a cosmetic container.

Figure 8:
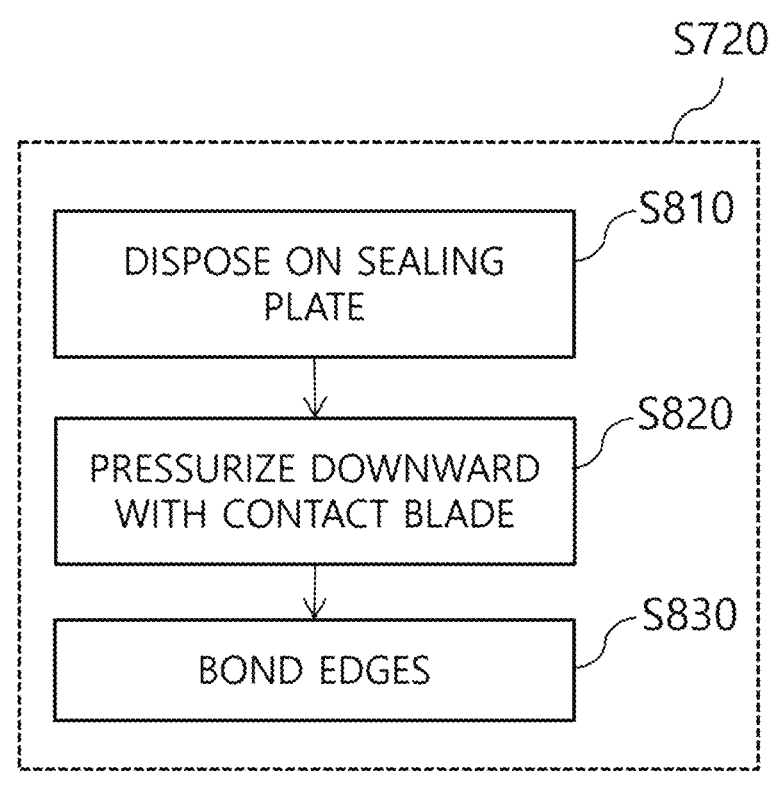
FIG. 8 more specifically illustrates S720 in the method of FIG. 7.
Figure 9:
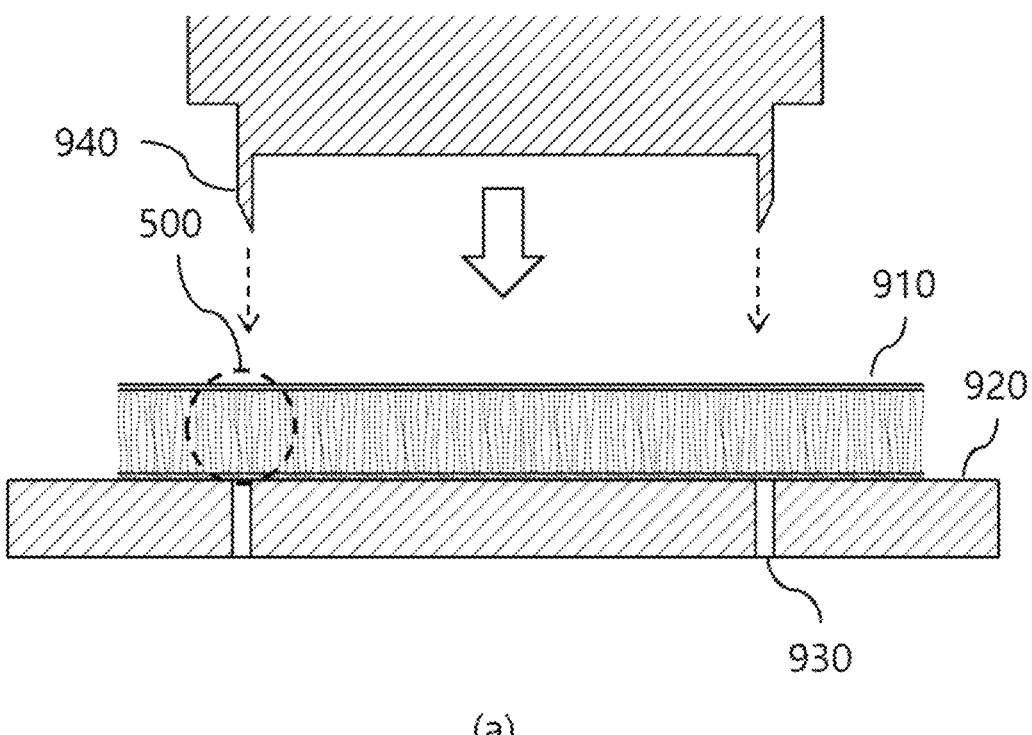
FIG. 9 illustrates the forming process according to the method of FIG. 8.
Figure 9:
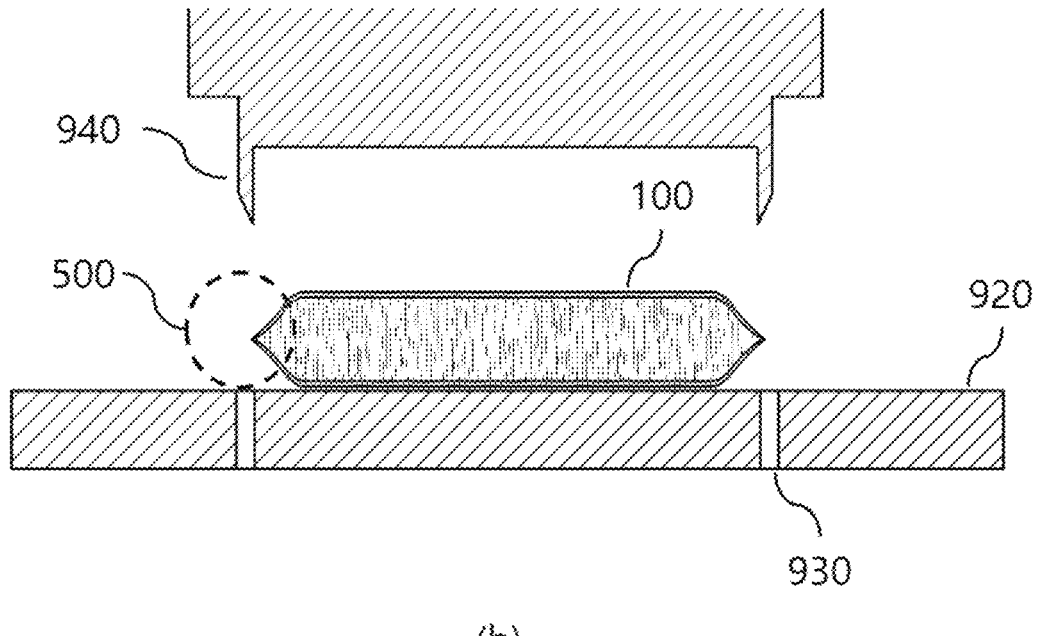

FIG. 8 more specifically illustrates S720 in the method of FIG. 7, and FIG. 9 illustrates the forming process according to the method of FIG. 8

In S820, the upper fabric layer and the lower fabric layer of a fabric member 910 are bonded at the edges 500, and specifically, this may include disposing the fabric member 910 on a sealing plate 920 (S810); pressurizing the fabric member 910 downward with a contact blade 940 (S820); and sealing the edges 500 by generating internal heat at the edges 500 (S830).

First, referring to (a) of FIG. 9, in S810, the fabric member 910 may be disposed on the sealing plate 920. The sealing plate 920 is used to generate ultrasonic waves, and the fabric member 910 may be disposed on the sealing plate 920 such that the bonding site (that is, the edges 500) of the fabric member 910 is located on an ultrasonic generator 930 of the sealing plate 920.

Subsequently, in S820, the fabric member 910 may be pressurized downward with a contact blade 940. The contact blade 940 is a structure projecting in correspondence with the bonding site (that is, the edges 500) between the ultrasonic generator 930 of the sealing plate 920 and the cosmetic material impregnation member 100, and as the contact blade 940 may be pressurized downward to the fabric member 910, the edges 500 of the upper fabric layer and the lower fabric layer may be in contact with each other.

While the edges 500 are in contact with each other in S820, the edges 500 of the fabric member 910 may be sealed (S830). S830 may be performed by generating internal heat at the edges 500 of the upper fabric layer and the lower fabric layer by ultrasonic waves generated from the sealing plate 920 (particularly, the ultrasonic generator 930 of the sealing plate 920). More specifically, from the edges 500 at which the upper fabric layer and the lower fabric layer are in contact with each other, vibration may be generated by ultrasonic waves, thereby generating internal heat, such that the upper fabric layer and the lower fabric layer may be thermally sealed at the edges 500, and the fabric member 910 outside the edges 500 may be cut from the cosmetic material impregnation member 100 (refer to (b) of FIG. 9).

Figure 10:
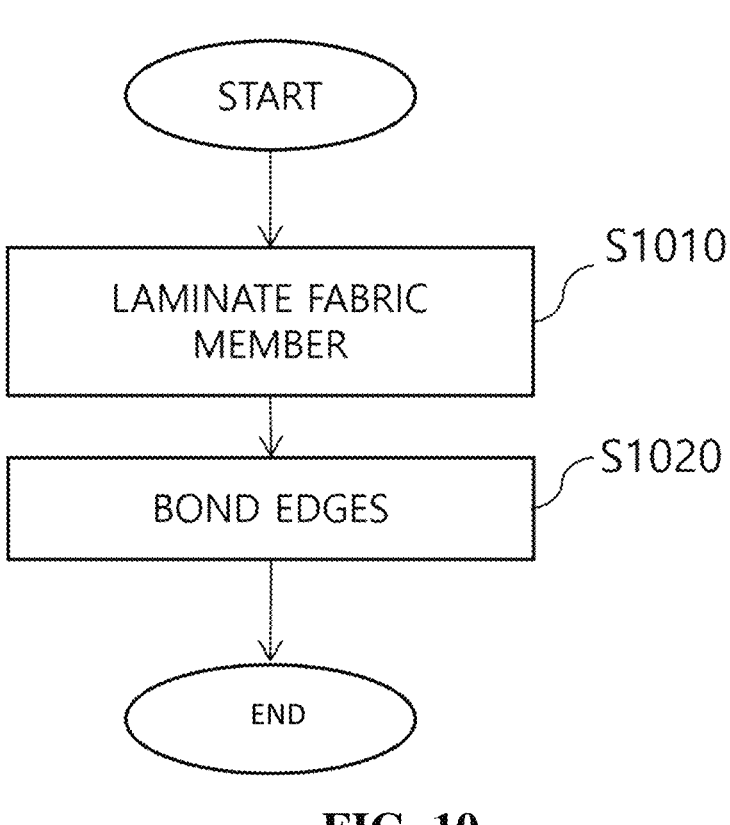
FIG. 10 illustrates a method of manufacturing a cosmetic material impregnation member set according to one embodiment of the present invention.
Figure 11:
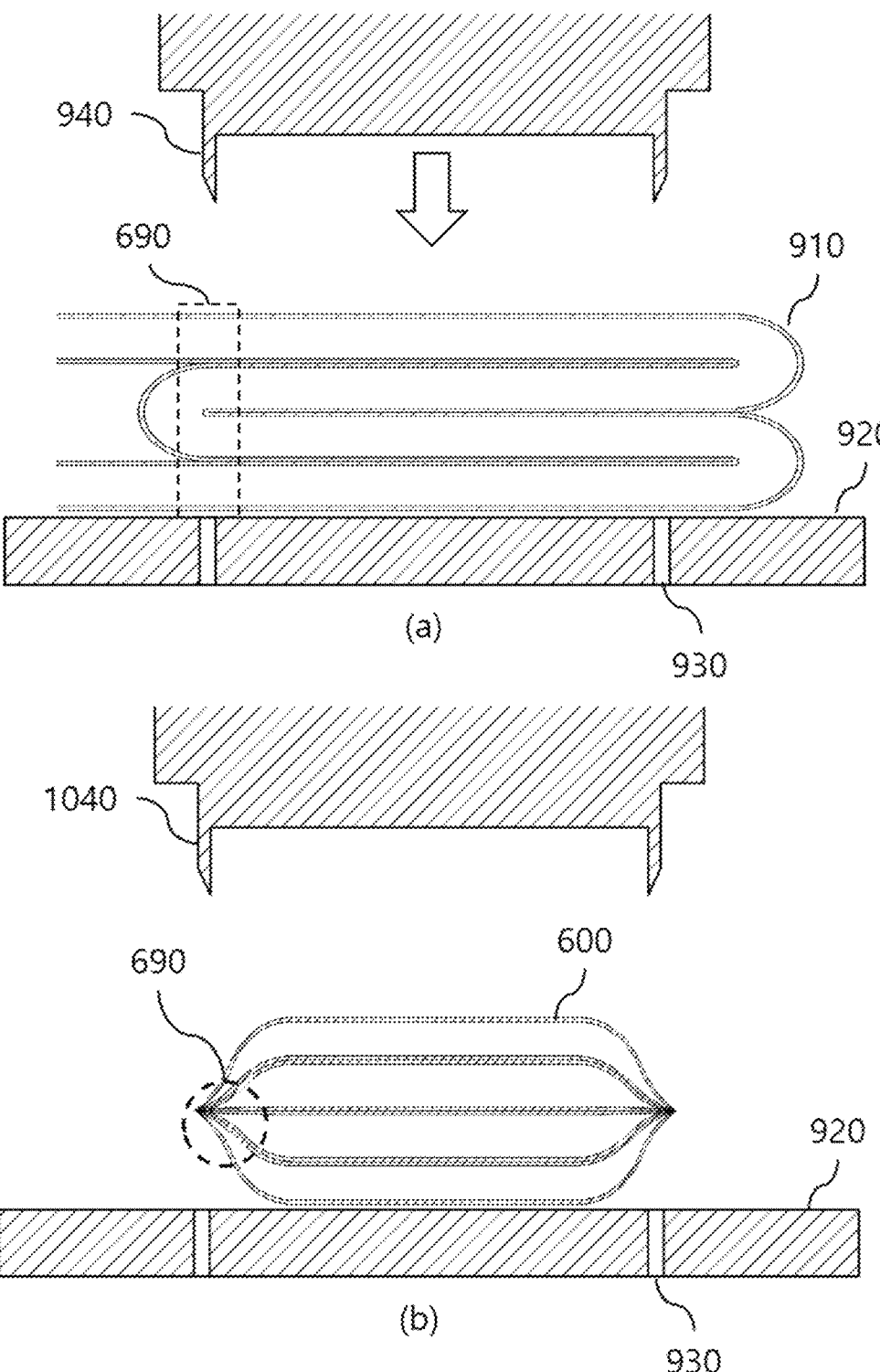
FIG. 11 illustrates the forming process according to the method of FIG. 10.

FIG. 10 illustrates a method of manufacturing a cosmetic material impregnation member set according to one embodiment of the present invention, and FIG. 11 illustrates the forming process according to the method of FIG. 10.

Referring to (a) of FIG. 11, in S1010, a fabric member 910 may be laminated on a sealing plate 920. In S1010, the fabric member 910 is bent to overlap by a folding process performed once or multiple times such that a plurality of regions of one fabric member 910 overlap each other.

Figure 12:
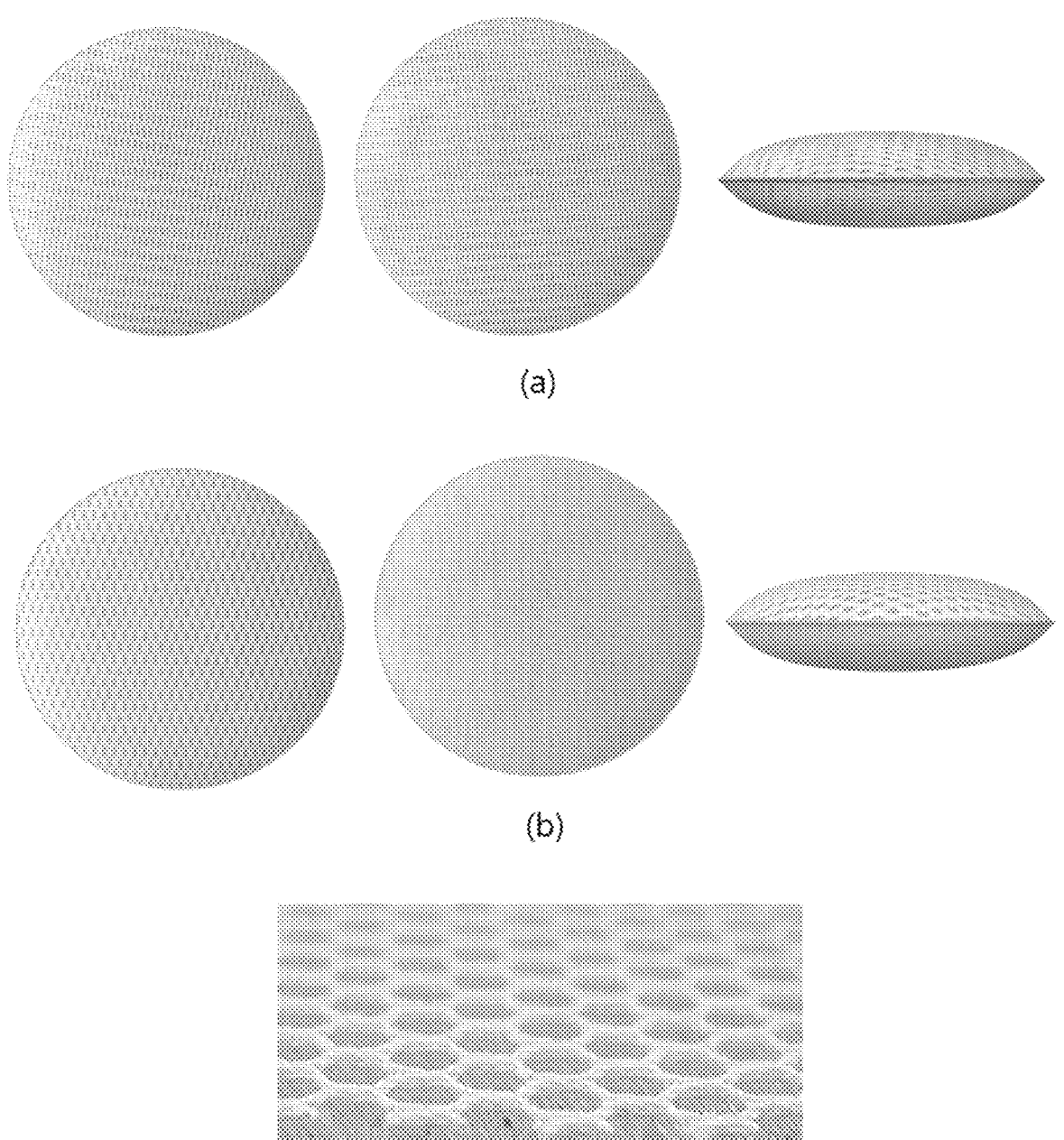
FIG. 12 illustrates an example of a cosmetic material impregnation member according to one embodiment of the present invention.

Referring to (b) of FIG. 12, in S1020, the fabric member 910 may be pressurized downward with a contact blade 940 and thermally sealed to bond edges 670 of the fabric member 910. The overlapping layers of the fabric member 910 may be bonded as a whole through the bonding of S1020, and the edges 690 of the layers of the fabric member 910 may be bonded at the same time.

FIG. 11 shows S1010 performed by a folding process on the single fabric member 910. However, this procedure is exemplary, and may be performed by various methods according to embodiments of the present invention. For example, S1010 may be performed by laminating a plurality of fabric members rather than one fabric member 910. Here, a plurality of the fabric members may be provided by cutting one fabric member into sizes and shapes that are easily processed (e.g., by laser).

In addition, FIG. 11 illustrates S1020 performed by thermal sealing. However, this procedure is exemplary and may be performed by various methods according to embodiments of the present invention. For example, S1020 may be performed by applying an adhesive material to the edges 690 for adhesion, or through external heat bonding which applies heat from the outside (using a heating/pressurizing member).

In addition, according to an embodiment, the method 1000 may further include disposing an auxiliary layer. This step may be performed by disposing an auxiliary layer on the uppermost upper fabric layer and/or the lowermost lower fabric layer of the fabric member(s) after being laminated in S1010. Afterward, the auxiliary layer may also be bonded when the edges 690 of the fabric member(s) 910 are bonded in S1020.

Experimental Example 1—Impregnation Performance Test

Cosmetic material impregnation members according to the present invention (Examples 1 and 2) and cosmetic material impregnation members formed of polyurethane (Comparative Examples 1 and 2) were manufactured, and then a cosmetic material impregnation performance test was performed. The impregnation performance test was performed on each member with a low-viscosity cosmetic liquid and a high-viscosity cosmetic liquid, wherein the low-viscosity cosmetic liquid and the high-viscosity cosmetic liquid were cosmetic liquids having viscosities of 11000 cp and 30000 cp, respectively. The test results are shown below.

TABLE 1

| | | | | Impregnation amount (g) | |
| --- | --- | --- | --- | --- | --- |
| | Diameter (mm) | Height (mm) | Weight (g) | Low-viscosity cosmetic liquid | High-viscosity cosmetic liquid |
| Example 1 | 48 | 3.5 | 0.54 | 2.81 | 2.99 |
| Example 2 | 48 | 12 | 1.98 | 9.93 | 10.01 |
| Comparative Example 1 | 48 | 3.5 | 0.24 | 2.79 | 3.04 |
| Comparative Example 2 | 48 | 12 | 0.83 | 11.49 | 11.97 |

Referring to the test results, when the cosmetic material impregnation members have the same volume, it can be seen that the examples have densities approximately 2 times those of the comparative examples. That is, the examples are configured to have higher densities than the comparative examples, and thus can have more excellent shape supporting capacity and restoration capacity.

In addition, conventionally, when the density of a cosmetic material impregnation member increases, pores into which the cosmetic material is impregnated are reduced, and thus the impregnation capacity of the cosmetic material impregnation member is reduced, showing that, compared to the comparative examples, the examples of the present invention have the same or similar cosmetic material impregnation capacity despite having twice the density.

Particularly, while the comparative examples have different impregnation capacities for high-viscosity and low-viscosity cosmetic liquids, it can be confirmed that the examples of the present invention show uniform impregnation performance regardless of a cosmetic liquid viscosity.

Experimental Example 2—Bursting Strength Test

A bursting strength test (KS K ISO 13938-1, hydraulic method) was performed on the same cosmetic material impregnation members (Example 1 and Comparative Example 1) used in Experimental Example 1, a cosmetic material impregnation member according to the present invention (Example 3) having a height of 6 mm, compared to Example 1, and a cosmetic material impregnation member formed of polyurethane (Comparative Example 3) having a height of 6 mm, compared to Comparative Example 1. The burst strength method is for determining the strength that each cosmetic material impregnation member can withstand without being ruptured by an external force, and the test results are as follows.

TABLE 2

|  | Example 1 | Example 3 | Comparative Example 1 | Comparative Example 3 |
|---|---|---|---|---|
| Burst strength (kPa) | 1192 | 1010 | 232 | 311 |

Referring to the test results, it can be seen that the examples of the present invention have a burst strength 3 to 5 times that of the comparative examples, and thus have greater durability against an external force (particularly, abrasion).

Experimental Example 3—Absorption Test

An absorption test including a water repellency test, an absorption rate test and an absorption distance test was performed on the same cosmetic material impregnation members (Examples 1 and 3 and Comparative Examples 1 and 3) used in Experimental Example 2. The water repellency test (KS K ISO 4920, spray method) is for confirming the resistance to wetting, in other words, absorbency, and is performed by a method of shaking water out of an impregnation member that has been sprayed with water, and examining the wet surface of the cosmetic material impregnation member. The absorption rate test (KS K 0642, dropping method) is performed by a method of dropping purified water on the surface of a cosmetic material impregnation member, and measuring a time until there is no longer visible water drop reflected by light (that is, in a state in which the member is fully wet and has no wetness on its surface). In addition, the absorption distance test (KS K 0642, Bireck method) is performed by a method of cutting a cosmetic material impregnation member in a predetermined longitudinal direction and measuring the height to which a test solution rises due to a capillary phenomenon after a predetermined period of time during which one end reaches the surface of the test solution in the container. The test solutions sequentially used in the absorption distance test are purified water, an oil ingredient, and a mixed solution of purified water/oil ingredient/emulsifier. The absorbency test results are shown below.

TABLE 3

|  | Example 1 | Example 3 | Comparative Example 1 | Comparative Example 3 |
|---|---|---|---|---|
| Water repellency (ISO grade) | 0 | 0 | 4 | 4 |
| Absorption rate (sec) | 0 | 0 | 60 or more | 60 or more |
| Absorption distance (mm) | 45.5 | 78.5 | 0 | 0 |
|  | 39 | 54 | 0 | 0 |
|  | 32.5 | 36.5 | 0 | 0 |

Regarding the water repellency test results, the ISO 0 grade (AATCC photographic grade 0) of Examples 1 and 3 indicates that the surface of the impregnation member was fully wetted, and the ISO 4 grade (AATCC photographic grade 90) of Comparative Examples 1 and 3 indicates slight adhesion or wetness on the surface of a specimen. In addition, referring to the results of the absorption rate test, it can be confirmed that, in the examples of the present invention, distilled water was absorbed on the surface as soon as it was dropped, whereas in the comparative examples, no distilled water was absorbed on the surface during the test time (up to 60 seconds). Finally, referring to the absorption distance test results, it can be confirmed that, in the examples of the present invention, regardless of the type of test solution, a considerable amount of the test solution was absorbed, whereas in the comparative examples, a test solution was not absorbed at all.

That is, it can be seen that the examples of the present invention exhibit high absorbency to an extent that moisture can be completely or considerably absorbed within a short period of time, whereas the comparative examples exhibit significantly low absorbency. According to such difference in absorbency, the examples of the present invention exhibit a high cosmetic material impregnation rate, thereby improving the efficiency of a cosmetic production process, and even when cosmetics are used, an unused cosmetic liquid of the cosmetic liquid released from an impregnation member by pressurization may be quickly absorbed back into the impregnation member, thereby also improving convenience.

FIG. 12 illustrates an example of a cosmetic material impregnation member according to one embodiment of the present invention.

(a) of FIG. 12 shows an impregnation member in which an upper fabric layer and a lower fabric layer have the same mesh structure, and (b) of FIG. 12 shows an impregnation member in which an upper fabric layer and a lower fabric layer have different mesh structures. As such, since a fabric is manufactured by weaving in the present invention, various mesh structures may be easily manufactured, and a variety of aesthetic effects and releasing performance may be easily adjusted through various combinations of mesh patterns.

In addition, (c) of FIG. 12 is a cross-sectional view of a cut part of the impregnation member. As shown in FIG. 12C, the upper fabric layer and the lower fabric layer may be connected with a plurality of fiber yarns, thereby forming a support layer. That is, in the support layer, a plurality of fiber yarns may connect the upper fabric layer and the lower fabric layer at various angles, and such a plurality of fiber yarns may be clustered to space the upper fabric layer and the lower fabric layer apart from each other, to maintain the entire structure of the impregnation member, and to provide suitable elastic restoration. In addition, the space between fiber yarns may provide a path through which a cosmetic material can be impregnated and flow in/out.

The shape of the impregnation member shown in FIG. 12 is exemplary, and various shapes may be applied according to embodiments of the present invention.

As described above, in the drawings and specification, optimal embodiments are disclosed. Here, specific terms are used, but this is only for the purpose of describing the present application and does not limit the meaning or the scope of the present application described in the claims. Therefore, it should be understood by those of ordinary skill in the art that various modifications and equivalents can be made from the embodiments of the present application. Thus, the true technical scope should be determined by the technical spirit of the appended claims.

The invention claimed is:

1. A cosmetic material impregnation member set comprising:
a plurality of cosmetic material impregnation members, which are impregnated with a cosmetic material to be used by being applied to a cosmetic applicator, the plurality of cosmetic material impregnation members laminated on one another and having a unified member edge, each of the plurality of cosmetic material impregnation members including:
a first fabric layer having a first mesh structure,
a second fabric layer having a second mesh structure, and
a support layer having a plurality of fiber yarns which connect the first fabric layer and the second fabric layer, the support layer defining an impregnation space between the first fabric layer and the second fabric layer and configured to retain the cosmetic material,
wherein edges of each of the plurality of cosmetic material impregnation members are simultaneously pressed and bonded together to define the unified member edge,
wherein the unified member edge has a thickness smaller than a thickness of each of the plurality of cosmetic material impregnation members, and
wherein the unified member edge integrates the plurality of cosmetic material impregnation members into a single structure and blocks leakage of the cosmetic material from a plurality of impregnation spaces.

2. The cosmetic material impregnation member set of claim 1, wherein:
a topmost first fabric layer and a lowermost second fabric layer of the plurality of cosmetic material impregnation members which are laminated have a single fabric layer,
each intermediate layer is defined by a first fabric layer of one cosmetic material impregnation member bonded to a second fabric layer of an adjacent cosmetic material impregnation member, and the intermediate layers have a thickness twice that of the topmost first fabric layer and a lowermost second fabric layer.

3. The cosmetic material impregnation member set of claim 1, wherein the cosmetic material is configured to permeate between the first fabric layer and the second fabric layer through the first mesh structure and the second mesh structure.

4. The cosmetic material impregnation member set of claim 1, wherein each of the first mesh structure and the second mesh structure has a plurality of release pores, a release level is determined based on sum of areas of the plurality of release pores and sum of circumferences of the plurality of release pores, and an amount of inflow and outflow of the cosmetic material is determined according to the release level.

5. The cosmetic material impregnation member set of claim 4, wherein the first mesh structure and the second mesh structure have different release levels.

6. The cosmetic material impregnation member set of claim 4, wherein the first mesh structure of the first fabric layer has a plurality of mesh structures formed in different regions and having different release levels.

7. The cosmetic material impregnation member set of claim 1, wherein a plurality of fiber yarns connect the first fabric layer and the second fabric layer at the same or different angles.

8. The cosmetic material impregnation member set of claim 1, wherein an auxiliary layer is bonded to at least one of an uppermost first fabric layer and a lowermost second fabric layer of the plurality of cosmetic material impregnation members.

9. The cosmetic material impregnation member set of claim 8, wherein a coating layer is bonded to at least one of the auxiliary layer.

10. The cosmetic material impregnation member set of claim 1, further comprising a fabric pouch accommodating the plurality of the cosmetic material impregnation members which are laminated.

11. A method of manufacturing a cosmetic material impregnation member set, the method comprising:
forming a plurality of cosmetic material impregnation members, which are configured to be impregnated with a cosmetic material to be used by being applied to a cosmetic applicator, each of the plurality of cosmetic material impregnation members including:
a first fabric layer having a first mesh structure,
a second fabric layer having a second mesh structure, and
a support layer having a plurality of fiber yarns connecting the first fabric layer and the second fabric layer, the support layer defining an impregnation space between the first fabric layer and the second fabric layer and configured to retain the cosmetic material;
laminating the plurality of cosmetic material impregnation members on one another; and
simultaneously bonding edges of each of the plurality of cosmetic material impregnation members together to define a unified member edge,
wherein the simultaneously bonding includes:
disposing the plurality of cosmetic material impregnation members on a sealing plate,
simultaneously pressing the edges of the first fabric layer and the second fabric layer of the plurality of cosmetic material impregnation members with a contact blade shaped to conform to the edges to bring the edges into contact, and sealing the edges of the plurality of cosmetic material impregnation members by ultrasonic bonding under pressure, wherein the unified member edge has a thickness smaller than a thickness of each of the plurality of cosmetic material impregnation members, and wherein the unified member edge integrates the plurality of cosmetic material impregnation members into a single structure and blocks leakage of the cosmetic material from a plurality of impregnation spaces.

12. The method of claim 11, wherein the forming is performed by weaving the first fabric layer, the second fabric layer and the support layer as a whole.

13. The method of claim 11, wherein the laminating is performed by a folding process which allows a plurality of regions of the cosmetic material impregnation member to overlap each other.

14. The method of claim 11, wherein the forming includes determining predetermined density of the plurality of fiber yarns in reply to cosmetic material impregnation capacity and supporting capacity.

15. The method of claim 11, wherein each of the first mesh structure and the second mesh structure has a plurality of release pores, a release level is determined based on sum of areas of the release pores and sum of circumferences of the release pores, and an amount of inflow and outflow of the cosmetic material is determined according to the release level.

16. The method of claim 15, wherein the first mesh structure and the second mesh structure have different release levels.

17. The method of claim 15, wherein the first mesh structure of the first fabric layer has a plurality of mesh structures formed in different regions and having different release levels.

18. The method of claim 11, wherein each of a plurality of fiber yarns connects the first fabric layer and the second fabric layer at the same or different angles.

19. The method of claim 11, wherein the disposing includes disposing an auxiliary layer on at least one of an uppermost first fabric layer and a lowermost second fabric layer of the plurality of cosmetic material impregnation members.

20. The method of claim 19, wherein a coating layer is bonded to at least one of the auxiliary layer.

* * * * *